(12) United States Patent
Anderson et al.

(10) Patent No.: US 9,989,186 B2
(45) Date of Patent: Jun. 5, 2018

(54) PIG LOADER DEVICE

(71) Applicant: John Anderson Construction, Inc., Warren, PA (US)

(72) Inventors: John Anderson, Russell, PA (US); John Shelley, Eldred, PA (US)

(73) Assignee: John Anderson Construction, Inc., Warren, PA (US)

( * ) Notice: Subject to any disclaimer, the term of this patent is extended or adjusted under 35 U.S.C. 154(b) by 300 days.

(21) Appl. No.: 15/056,009

(22) Filed: Feb. 29, 2016

(65) Prior Publication Data

US 2016/0348829 A1 Dec. 1, 2016

Related U.S. Application Data

(60) Provisional application No. 62/166,412, filed on May 26, 2015.

(51) Int. Cl.
*F16L 55/46* (2006.01)

(52) U.S. Cl.
CPC .................. *F16L 55/46* (2013.01)

(58) Field of Classification Search
CPC ....................................... F16L 55/46
See application file for complete search history.

(56) References Cited

U.S. PATENT DOCUMENTS

| 5,103,524 A * | 4/1992 | Vowles | B08B 9/0556 |
| | | | 15/104.063 |
| 6,029,302 A * | 2/2000 | Coura | B08B 9/055 |
| | | | 15/104.062 |

\* cited by examiner

*Primary Examiner* — Laura C Guidotti
(74) *Attorney, Agent, or Firm* — Buchanan Ingersoll & Rooney PC (57) ABSTRACT

A pig loader device can include a breech assembly having a chamber body, a ramrod compartment, a breech, and a neck. A ramrod having a push plate, a rod, and a breech plate may be disposed within the ramrod compartment and configured to slideably traverse the ramrod compartment and the breech. In use, the device can be connected to an ancillary pipe via the neck, and a pig may be placed within the breech and aligned be to be slid within the breech and neck upon engagement with the ramrod to facilitate pigging operations of a pipeline. The ramrod may then be forced forward to an extended position, thereby urging the pig through the neck to be seated within the pipe. The device may then be detached from the pipe to enable continued pigging operations.

19 Claims, 6 Drawing Sheets

PIG LOADER DEVICE

CROSS-REFERENCE TO RELATED APPLICATIONS

This patent application claims the benefit of co-pending U.S. Provisional Patent Application No. 62/166,412, filed on May 26, 2015, which is hereby incorporated by reference in its entirety.

BACKGROUND OF THE INVENTION

Field of the Invention

Embodiments relate to a device for seating a pig within a pipe, and in particular introducing and properly seating a pig within a pipe through a breech assembly.

Background of the Related Art

Subterranean extraction of oil and gas and transportation of the same typically includes the use of a pipeline to direct the oil and gas under volumetric pressure for processing and tapping. Surfactants, dispersants, and other compounds may be introduced into the pipeline to facilitate the processing of the extracted oil and gas. These compounds, as well as the organic and volatile compounds extracted with the oil and gas, tend to adhere to and create obstructions within the pipeline. A common practice is to clean the bore of the pipe comprising the pipeline with the use of a wad or a plug, commonly known as a pig. The pig is introduced into the pipe and forced through the pipeline to entrain and push any buildup deposited on the pipe to be extracted from the pipeline.

Typically, the pig is introduced at a mouth or other entry point of the pipeline to be seated within the pipe before being forced through the line. This can be a dangerous operation due to the pressures involved and the forces used to properly seat the pig within the pipe. Existing pigging operations typically require operators to introduce the pig through a funnel placed at an entrance way of a pipe. Operators can hold the pig in place on the funnel with a rod, pipe, or piece of timber while the pig is pushed into the pipe via mobile equipment, such as an excavator or bulldozer. Consequently, this exposes operators to possible pinch points and objects subjected to large forces (i.e., objects becoming projectiles).

The present disclosure is directed at overcoming one or more of the above-mentioned problems.

SUMMARY OF THE INVENTION

The device can include a breech assembly having a chamber body, a ramrod compartment, a breech, and a neck. A ramrod having a push plate, a rod, and a breech plate may be disposed within the ramrod compartment and configured to slideably traverse the ramrod compartment and breech. In use, the device can be connected to an ancillary pipe via the neck. A pig may be placed within the breech and aligned to be slid within the breech and neck upon engagement with the ramrod. The ramrod compartment may be configured to prevent both the push plate and the breech plate from entering the ramrod compartment, thus preventing over retraction/extension of the ramrod. In addition, the ramrod compartment may be configured to align the ramrod so that when advanced from the ramrod compartment to the neck, the breech plate makes contact with the pig and forces it towards the neck.

Some embodiments may include a breech shield configured to selectively cover the breech, which may prevent ingress and egress of objects through the breech. Securement means may be used to temporarily secure the breech shield in a covered position. For example, during operation of the device, the breech shield can be secured in the covered position so as to prevent objects from entering and/or exiting the chamber body though the breech.

The neck can be used to connect the device to an ancillary pipe to facilitate pigging operations performed on the pipeline. With the breech shield in a non-covered position, the ramrod can be drawn back to a retracted position so that a pig may be loaded into the breech. The breech shield may then be placed in a covered position and secured in place via the securement means to ensure no ingress or egress through the breech may occur. The ramrod may then be forced forward to an extended position, thereby urging the pig through the neck and into the ancillary pipe. The device may then be detached from the pipe to enable continued pigging operations.

The device can enable operators to achieve a preparatory step of pigging a pipeline, which may include loading a pig into the pipeline, in a clean, safe, and efficient manner. When attached to the pipe and with the breech shield in a covered position, the device may generate a contained work area ensuring that moving parts, potential pinch points, and potential projectiles are confined within the device. The device may not only obviate the need for operators to handle the pig when it is being introduced into the pipe, but it can also prevent operators from inadvertently being injured within a pinch point or by an object being projected from within the chamber body.

While embodiments described herein illustrate use of the device for pigging oil and gas pipeline, the device is certainly not limited to such use. The device may be used for introduction of a pig, or similar wad/plug, into other industrial fluid-processing operations that may require cleaning and unclogging of the pipeline used therewith. In addition, the device is not limited to clearing obstructions, but may also be used to prepare a pipeline for batch treatment of fluids being processed through the pipe. For instance, it may be beneficial to "clear" the pipeline of remnants of a first fluid or first stage of a batch treatment process before processing a second fluid or subsequent batch. As another example, the device may be used for introduction of a pig into a pipeline to prepare the pipeline for hydrostatic testing or other type of structural integrity testing.

While these potential advantages are made possible by technical solutions offered herein, they are not required to be achieved. The presently disclosed device can be implemented to achieve technical advantages, whether or not these potential advantages, individually or in combination, are sought or achieved.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present invention will be more apparent from the following more particular description thereof, presented in conjunction with the following drawings, in which.

DETAILED DESCRIPTION OF THE INVENTION

The following description is of an embodiment presently contemplated for carrying out the present invention. This description is not to be taken in a limiting sense, but is made merely for the purpose of describing the general principles and features of the present invention. The scope of the present invention should be determined with reference to the claims.

Figure 1:
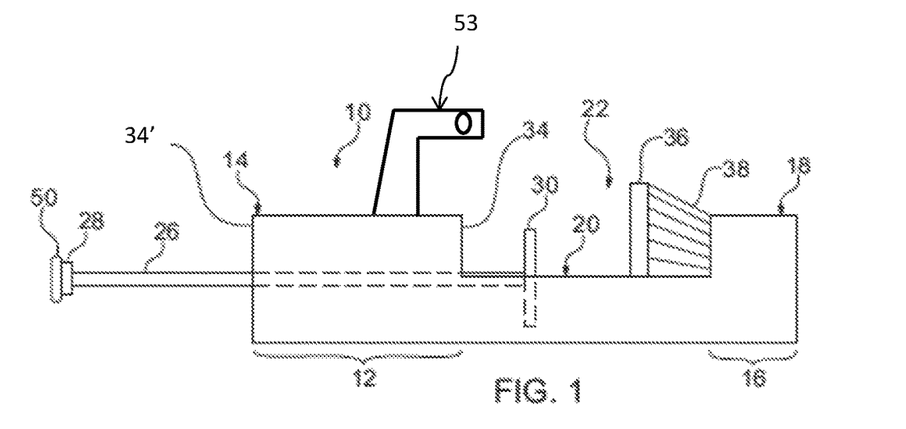
FIG. 1 is a side view of an exemplary pig loader device.
Figure 2:
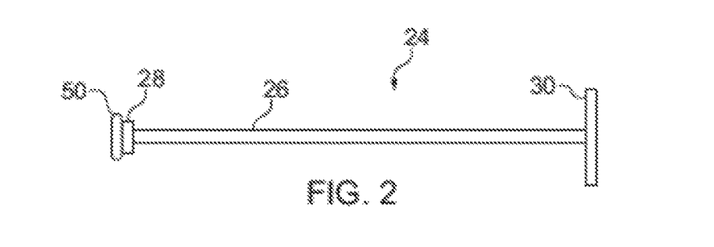
FIG. 2 is a side view of an exemplary ramrod that may be used with a pig loader device.
Figure 3:
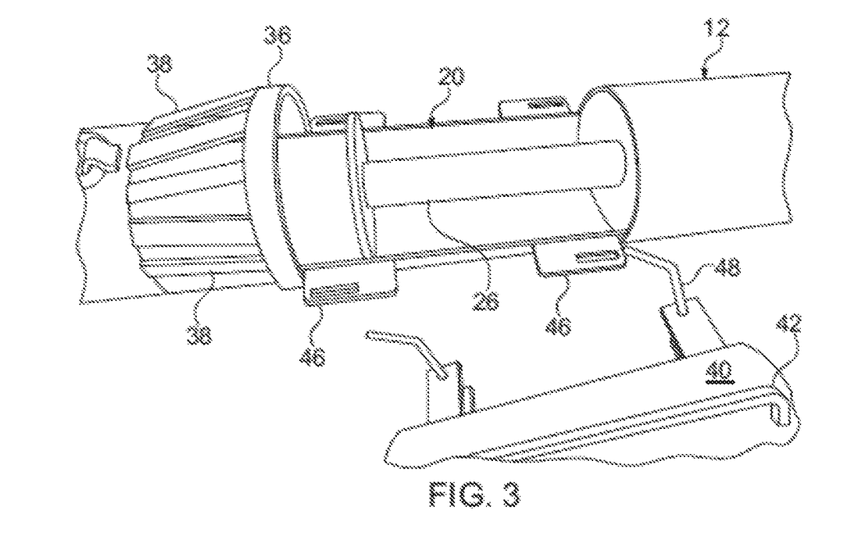
FIG. 3 is a top view partial view of an exemplary pig loader device showing a breech and chamber compartment.
Figure 8:
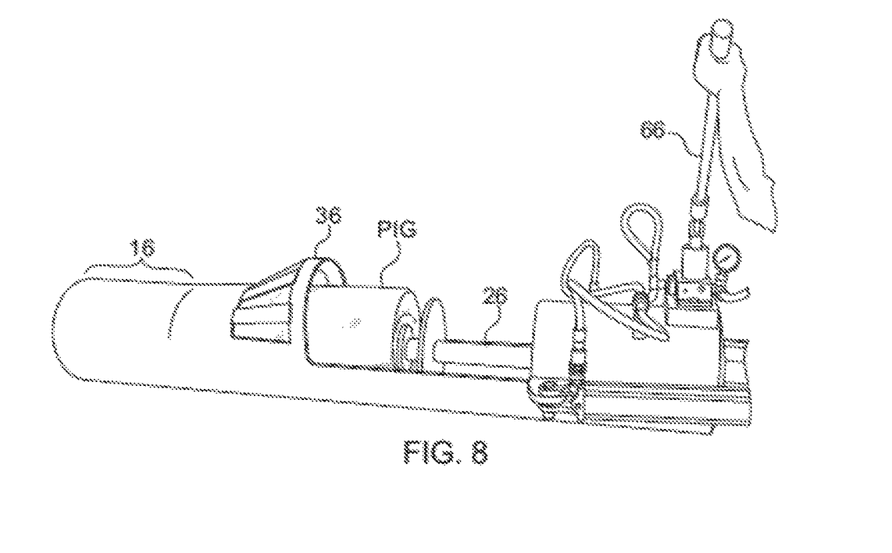
FIG. 8 is a partial perspective view of an exemplary pig loader device with a pig being forced into a neck of the device.

Referring to FIGS. 1-3, a pig loader device can include a breech assembly 10 having a ramrod compartment 12 at a first distal end 14 and a neck 16 at the second distal end 18, where a chamber body 20 lies between the distal ends 14, 18. The breech assembly 10 may be constructed of a material suitable to withstand strains and stresses associated with repeatedly forcing a pig from the chamber body 20 into an ancillary pipe. The material of construction may include metal or metal alloy. An aperture may be formed into a surface of the chamber body 20 establishing a breech 22 through which a pig (the pig is shown in FIG. 8) may be introduced to be placed into the chamber body 20. The neck 16 may have a cross-sectional shape complementing that of the ancillary pipe to which it can be temporarily attached during operation of the device.

In some embodiments, the breech assembly 10 can be an elongated cylindrical body having a bore extending from the first distal end 14 to the second distal end 18. A diameter of the bore can be the same as or similar to a diameter of a pig to be used with the device, yet the diameter of the bore can differ from the diameter of the pig. For example, a pig can be constructed of a tough, resilient material capable of being compressed without experiencing plastic deformation. With such embodiments, the diameter of the pig can be as much as 1.5 times the diameter of the bore. Typically, in pigging operations, the diameter of the pig is approximately 1.5 times the inner diameter of the pipe through which the pig is introduced. Pipelines for various oil and gas operations may require various sized pipes, and thus various sized pigs. Therefore, breech assembly 10 may be constructed to accommodate a particular sized pipeline, and thus a particular sized pig.

The inner diameter of the neck 16 can be slightly larger than an outer diameter of an ancillary pipe to which the device can be attached. The inner diameter of the neck 16 can greater, lesser, or the same as the diameter of the bore. For example, an inner surface of the bore can step in or step out at the neck 16 to generate a neck inner diameter of a dissimilar diameter of that of the bore. In addition, or in the alternative, the neck 16 can exhibit a flare (i.e., increasing in diameter from a neck/chamber-body interface to the second end 18) or a taper (i.e., decreasing in diameter from a neck-chamber-body interface to the second end 18). In some embodiments the flare or taper can be exhibited by the inner diameter of the neck, while the outer diameter of the neck remains constant. Some embodiments may include any one or any combination of the step, the flare, and the taper. Providing a step, a flare, and/or a taper can facilitate easier engagement of the device with a pipe and/or introduction of a pig into a pipe. For example, a user might not know the outer diameter of the mouth of a pipe, thus a flared inner diameter of the neck 16 can facilitate engagement of the device with the pipe. As another example, a stepped inner diameter can ensure that a neck/pipe interface is generated that enables proper alignment of a pig into a pipe.

Further embodiments may include at least one guide to better steer and/or align a pig for introduction into a pipe. For example, an inner surface of the chamber body 20 and/or neck 16 can include deflectable tabs, spring-loaded rollers, etc. that can urge a pig in a certain direction (e.g., a radial direction with respect to a longitudinal axis 54 of the device) as the pig is caused to traverse the bore of the breech assembly 10, neck-chamber-body interface, and/or neck/pipe interface.

The chamber body 20 can include a hollow portion of the breech assembly 10 configured to receive a pig. An inner surface of the chamber body 20 may exhibit a shape complementing the shape of the pig. Generally, the pig is cylindrical in shape to match that of the pipe, thus an inner chamber body 20 may have a cylindrical shape, but other shapes may be used. For example, an inner surface may be square, hexagonal, octagonal, etc. The neck 16 can extend from the chamber body 20, and may serve as a collar to assist guiding the device onto a pipe and facilitate attachment of the device to the pipe. For example, the device may be attached to a pipe by sliding the neck 16 over a distal end of the pipe. In addition, the neck 16 can assist with guiding a pig into the pipe during operation of the device. In some embodiments, the device can be clamped in place after being slid over a distal end of a pipe. This may be achieved via welding clamps or similar clamping mechanisms temporarily securing the device to a pipe. In addition to clamping, a portion of the neck 16 may be welded (e.g., spot welded) to the pipe. After welding is complete, the clamps may be removed. While the device can be secured to a pipe via clamping and/or welding, it need not be. For example, the device can be used by sliding the neck 16 over a distal end of a pipe where the neck, acting as a collar, effectuates sufficient retention of the device onto the pipe to facilitate effective operation of the device and introduction of a pig into the pipe.

The ramrod compartment 12 can be adjacent the chamber body 20 and be configured to retain a ramrod 24. The ramrod 24 may include a rod 26 having a push plate 28 at its first distal end and a breech plate 30 at its second distal end, wherein the rod 26 may be configured to slideably traverse the ramrod compartment 12 and chamber body 20. The ramrod 12 may be constructed of the same material as that of the breech assembly 10. While it is shown for the push plate 28 to be smaller in diameter than that of the breech plate 30, it need not be.

The ramrod compartment 12 may be configured to prevent both the push plate 28 and breech plate 30 from entering the ramrod compartment 12. The ramrod compartment 24 may be further configured to align the ramrod 24 so that when advanced from the ramrod compartment 12 toward the neck 16, the breech plate 30 forces a pig placed within the breech 22 through the neck 16 and into a pipe connected thereto. For example, the ramrod compartment 12 may be an enclosed barrel-shaped member with rod-apertures formed on the distal ends thereof, which may be arranged to enable sliding motion of the rod 26. The enclosed structure of the ramrod compartment 12 may prevent the ramrod 24 from being over retraced and/or over extended due to the abutment of the breech plate 30 and push plate 28 against the ramrod compartment ends 34, 34' in the fully retracted and extended states, respectfully. For example, as the ramrod 24 is retracted, it is moved toward the first end 14 of the device. In a fully retracted position, the breech plate 30 may abut a ramrod compartment second end 34. The abutment of the breech plate 30 with the ramrod compartment second end 34 can prevent further retraction of the ramrod 24. Thus, a fully retracted state can be caused by abutment of the breech plate 30 with the ramrod compartment second end 34. Similarly, as the ramrod 24 is extended, it is moved toward the second end 18 of the device. In a fully extended position, the push plate 28 may abut a ramrod compartment first end 34'. The abutment of the push plate 28 with the ramrod compartment first end 34' can prevent further extension of the ramrod 24. Thus, a fully extended state can be caused by abutment of the push plate 28 with the ramrod compartment first end 34. It is understood that the ramrod compartment 12 need not be enclosed to achieve prevention of over retraction/extension, and that other forms of mechanical stops may be used. For example, a spring-loaded pin tumbler assembly may be disposed within the breech assembly 10 with a complementary detent in the rod 26 may be used to prevent retraction/extension beyond a certain point. However, the enclosed structure of the ramrod compartment 12 may prevent operators from inadvertently coming into contact with the movement of the ramrod 24. The enclosed structure of the ramrod compartment 12 can also prevent operators from being caught within a pinch point of the device. Embodiments with an enclosed ramrod compartment 12 can include a first rod-aperture and a second rod-aperture through which the rod 26 traverses during retraction and extension.

In alternative embodiments, the ramrod compartment 12 may include guides that engage with the ramrod 24 to ensure proper alignment and smooth motioning of the ramrod 24. This may include a rail and track assembly, spring-loaded roller wheels, ball bearing assembly, a bearing race assembly, etc. For example, a ball bearing assembly may be disposed on at least one of a first rod-aperture and a second rod-aperture, each ball bearing assembly configured to engage the rod 26. The rod 26 is shown as having a cylindrical shape, but other shapes may be used. These may include, but are not limited to, cubic, hexagonal, triangular, etc. For instance, a cubic shape of the rod 26 may exhibit better alignment and slidable motion as that of the cylindrical shape.

In alternative embodiments, a breech plate 30 may include an attachment mechanism to temporarily attach the breech plate 30 to a pig. If a pig becomes improperly lodged within the device and/or pipe, the ramrod 24 may then be used to extract the pig by attaching the pig to the ramrod 24 via the attachment mechanism and retracting the ramrod 24, thereby pulling the pig back into the chamber body 20 where the pig can be repositioned and/or removed from the device. The attachment mechanism may include a shackle countersunk within the breech plate 30 from which a chain, cable, or rope may be tethered and similarly attached to a pig.

The breech 22 can include an aperture formed in the chamber body 20 and a hollow portion of the chamber body 20 adjacent the neck 16. The breech 22 may be configured to receive a pig through the aperture and hold the pig in an aligned position for introduction into the pipe through the neck 16. For example, the ramrod 24 can be retracted to clear the chamber body 20 while a pig is placed into the breech 22. As the ramrod 24 is extended, the breech plate 30 is moved toward the second end 18 to abut the pig and urge the pig through the neck/pipe interface until the pig is seated within a pipe. In a fully extended position, the push plate 28 can abut the ramrod compartment first end 34' to ensure that the ramrod 24 does not lodge into the pipe and/or seat the pig too far into the pipe. Abutting the push plate 28 against the ramrod compartment first end 34' can further ensure that the pig is fully seated into the pipe. Thus, the ramrod 24 can be configured so that a distance between the breech plate 30 and the push plate 28 may determine the seat-length of the pig within a pipe when the ramrod 24 is in a fully extended position. The seat-length can be defined as the distance the pig extends into the pipe.

In alternative embodiments, the position of the push plate 28 along the rod 26 may be adjusted so as to adjust the seat-length of the pig. For example, a push plate 28 can be threadingly engaged with the rod 26, telescopingly engaged with the rod 26, or form some other traversable engagement with the rod 26 so as to enable adjustment of the push plate's 28 position relative to the rod 26.

In further embodiments, bumpers 50 may be disposed on the push plate 28, the breech plate 30, and/or a ramrod compartment end 34, 34' to reduce abrasion and wear, as well as to prevent mushrooming and spurring of the push plate 28 and/or breech plate 30 and/or ramrod compartment ends 34, 34'. The bumper 50 may include a rubber or polymer member disposed on a surface of any a ramrod compartment end 34, 34' and/or any surface of the push plate 28 and/or the breech plate 30.

In alternative embodiments, the device may include a breech flange 36 disposed on the neck 16, which may be configured to partially extend over the breech 22. The breech flange 36 may have at least one of flange aperture 38 and may exhibit a semi-conical shape. The breech flange 36 may be used to assist with guiding the pig into the chamber body 20 via the breech 22, as well as enable operators to view the breech 22 area. Each flange aperture 38 may further assist an operator to view the breech 22 area. This may enable users to observe the breech 22 in case of malfunction or improper lodging, for example, without having to open a breech shield 40 and/or without having to exposing themselves to any potentially dangerous release of energy from an energized portion of the device.

Figure 4:
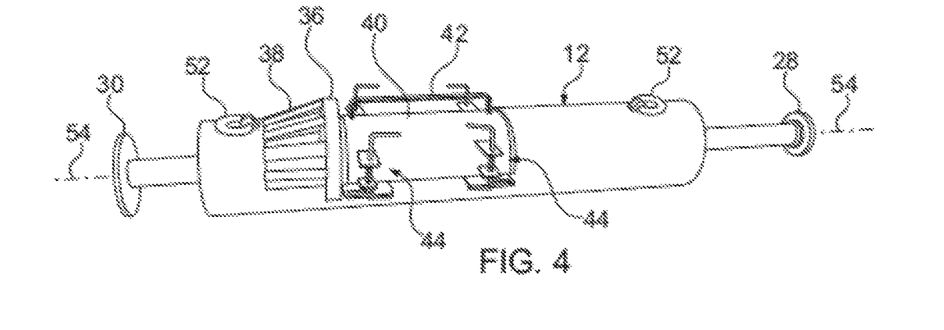
FIG. 4 is a perspective view of an exemplary pig loader device with a breech shield in a covered position.
Figure 5:
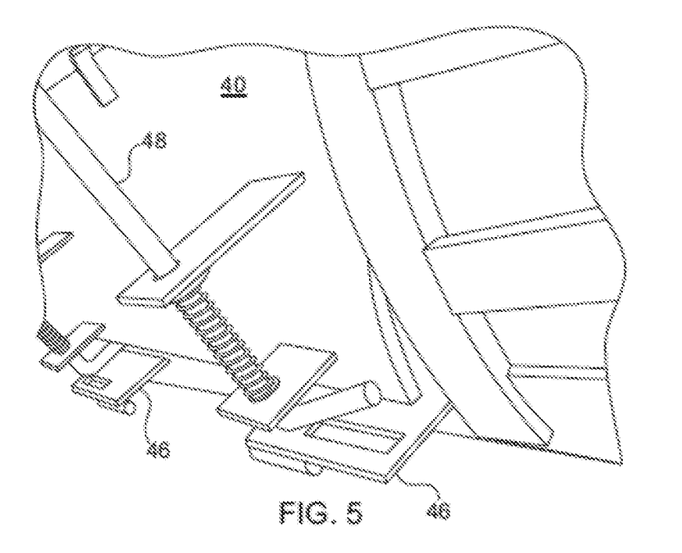
FIG. 5 is a partial view of an exemplary pig loader device showing a locking bolt and keyed plate that may be used with the device.
Figure 6:
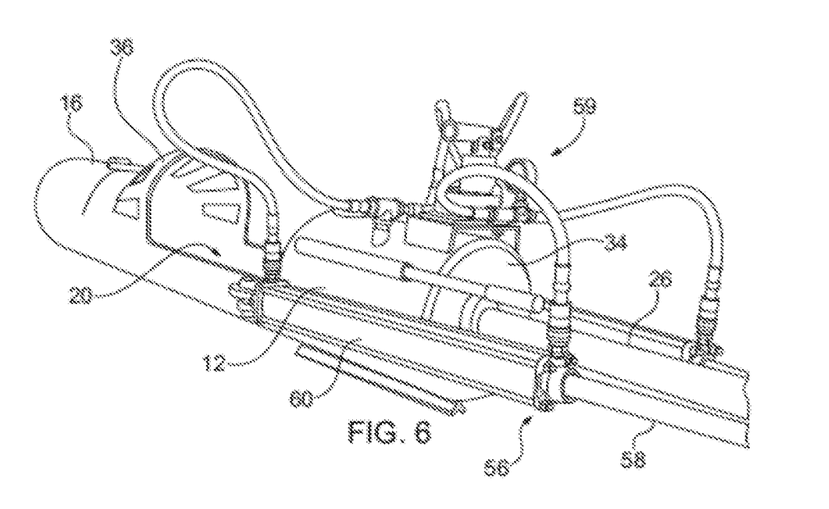
FIG. 6 is a partial perspective view of an exemplary pig loader device with a hydraulic actuator that may be used with the device.

Referring to FIGS. 4-5, a breech shield 40 may be used to selectively cover the breech 22. In a covered position, the breech shield 40 can prevent ingress and egress of objects through the breech 22. This can be beneficial during operation of the ramrod 24 (e.g., when causing the ramrod 24 to traverse the chamber body 20) so as to provide added safety for operators. The breech shield 40 may be a solid, rigid member structured to effectively cover the breech 22 and prevent passage of objects there-through. For example, the breech shield 40 can be a metal plate having a concave shape; however, other materials and shapes may be used. Manipulation of the breech shield 40 may be achieved by means of a handle 42 disposed on a surface thereof.

Securement means 44 may be used to temporarily secure the breech shield 40 in the covered position, which may include a plurality of keyed plates 46 disposed on the breech shield 40 and the breech assembly 10, each configured to receive locking bolts 48. Locking bolts 48 may include an angled bolt member attached via a spring-loaded swivel assembly to a keyed plate 46 of the breech shield 40. For example, the breech shield 40 can be configured to be removed from the breech assembly 10 to be in a non-covered position and to be placed onto the breech assembly 10 to be in a covered position. Upon placing the breech shield 40 in a covered position, at least one locking bolt 48 may be depressed, compressing the spring, so as to protrude through at least one aligned keyed plate 46 of the breech assembly 10. The locking bolt 48 may then be rotated and released to enable the angled bolt member to catch onto the keyed plate 46 of the breech assembly 10, thereby securing the breech shield 40 in the covered position. While a breech shield 40 may be secured with one keyed plate 46 and one locking bolt 48, a plurality of keyed plates 46 and locking bolts 48 can be used. Furthermore, other securement means may be utilized. These may include, but are not limited to, rotating latches, nut-and-bolt fastener, etc.

In alternative embodiments, the breech shield 40 may be hingedly attached to the breech assembly 10. For example, a non-covered position may be achieved by rotating the breech shield 40 away from the breech 22 and a covered position may be achieved by rotating the breech shield 40 toward the breech 22 until it abuts against a surface of the breech assembly 10. Further embodiments may include a breech shield 40 that is slidingly engaged with a track assembly of the breech assembly 10 so as to enable sliding the breech shield 40 into and out-from a covered position. For example, a breech shield 40 may be provided with at least one guide channel through which at least one guide rail attached to the breech assembly slidingly engages. A guide rail can be disposed on a surface of the breech assembly 10 adjacent the breech 22. In some embodiments rollers or bearings may be disposed within a guide rail to reduce friction and assist with smooth motioning of the breech shield 40. The track assembly may be disposed on an outer surface of the breech assembly 10 so as to not interfere with, or become damaged by, the placement and movement of a pig when a pig is placed within the chamber body 20. A bulwark may be used to cover and protect the track assembly from damage and obstructions.

In alternative embodiments, at least one shackle 52 may be disposed on a surface of the device to assist with maneuvering and positioning the device onto a pipe. This may facilitate rigging the device to a hoisting mechanism, such as a crane, front loader, or similar machinery via the shackles 52 and placed into position onto the pipe. In addition, or in the alternative, at least one lift arm 53 can be disposed on a surface of the device. Each lift arm 53 can be an angled structure (e.g., an L-shaped metal brace) extending from a surface of the device and positioned to facilitate attachment thereto by a hoisting mechanism (e.g., crane, forklift, etc.). For example, the lift arm 53 can be positioned near the first end 14 and extend upwards and forwards toward the second end 18. Each lift arm 53 can include an aperture enabling rigging to a hoist assembly of the hoist mechanism so that the device can be maneuvered while maintaining the device in an up-right position (e.g., the breech 22 facing upwards).

Actuating the ramrod 24 may be achieved by a unidirectional force acting to pull and/or push the ramrod 24 along a longitudinal axis 54 of the device. Pigs can be heavy and/or have a diameter that is up to 1.5 times the inner diameter of a pipe, so introduction of the pig into a pipe from the device can require significant force. Thus, doing so by manual labor may not be safe or even practical. Therefore, actuating the ramrod 24 may be achieved by pulling and pushing it with mobile equipment, such as a bulldozer, front loader, etc. However, alternative embodiments may include means to automate and/or mechanize the operation of the ramrod 24. This may include a spring loaded catapult mechanism, a hydraulic unit, a pneumatic unit, and/or other pressurized actuation means.

Referring to FIGS. 6-9, at least one embodiment can include at least one hydraulic actuator 59 to generate a unidirectional force along the longitudinal direction 54 (see FIG. 4). The hydraulic actuator 59 can include at least one a cylinder and piston assembly 56 in which a piston 58 can be configured to traverse a cylinder 60 from extend position to a retract position, as directed by a hydraulic circuit. Actuation of the hydraulic actuator 59 may act upon the ramrod 24 to move it in the longitudinal direction 54. For example, a cylinder and piston assembly 56 can be configured to generate a force vector that is coaxial, or at least parallel, with that of the longitudinal axis 54 so that unidirectional retraction and extension of each piston 58 of a cylinder 60 can cause extension and/or retraction of the ramrod 24.

Figure 7:
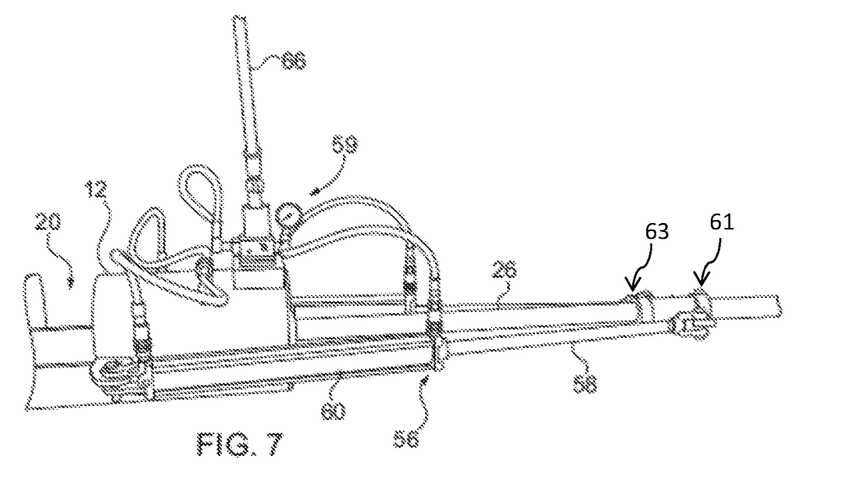
FIG. 7 is a partial perspective view of an exemplary pig loader device with two cylinder and piston assemblies that may be used with a hydraulic actuator.

In an exemplary embodiment, two cylinder and piston assemblies 56 can each be attached to a portion of the breech assembly 10, where an associated piston 58 for each may extend rearward beyond the first end 14. Distal ends of each piston 58 can be affixed via a coupler 61 to a portion of the ramrod 24. The coupler 61 can be a collar statically attached to a portion of the ramrod 24 and structured to facilitate unison movement of the ramrod 24 with each piston 58 as both pistons 58 are actuated by the hydraulics of the hydraulic actuator 59. Each piston 58 can be affixed to the coupler 61 via a shackle-pin assembly, hitch-pin assembly, etc. The hydraulic actuator 59 can be placed into fluid communication with each cylinder and piston assembly 56 via hydraulic hoses and hydraulic couplings, which may include use of quick-connect hydraulic fittings.

Figure 9:
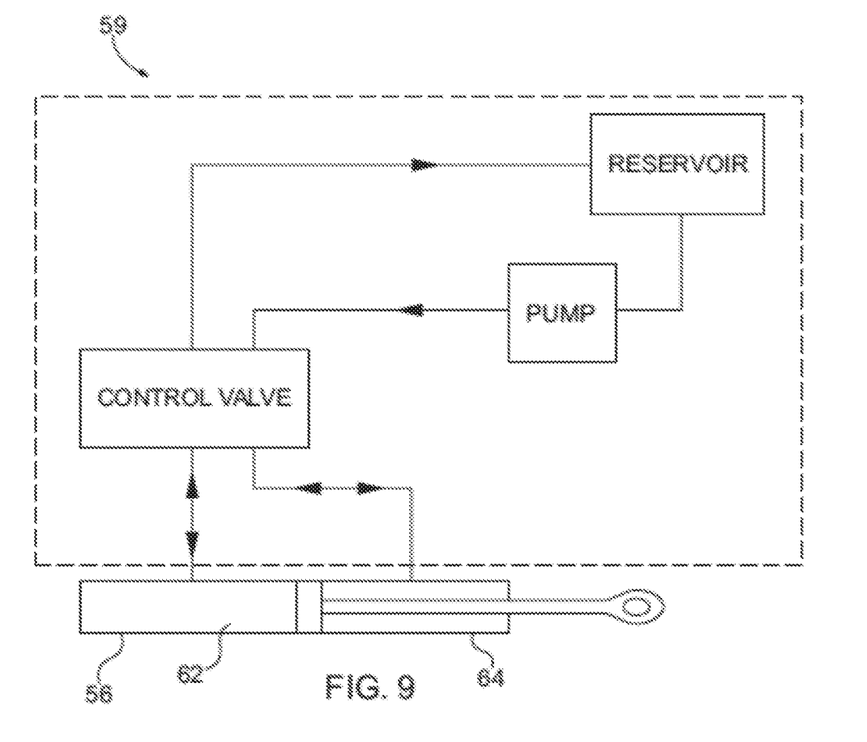
FIG. 9 is an example hydraulic circuit that may be used for a hydraulic actuator of an exemplary pig loader device.

The hydraulic actuator 59 can include a control valve in fluid connection with a reservoir and a pump, which may also include a filter. Other components can include pressure relief valves, pressure gauges, other motors, etc. In some embodiments, the ramrod compartment 12 can serve as the reservoir. A control lever 66 can be used to operate the control valve to cause hydraulic fluid to be pumped to and from the reservoir. Each cylinder and piston assembly 56 can be caused to extend and/or retract by forcing hydraulic fluid into and/or drawing hydraulic from at least one compartment 62, 64 of each cylinder and piston assembly 56. For example, extension/retraction of a cylinder and piston assembly 54 can be achieved by causing the pump to force hydraulic fluid into a first compartment 62 and/or withdrawing hydraulic fluid from a second compartment 64, thereby forcing a piston 58 to extend/retract and thus act upon the ramrod 24 and impart a force vector on the ramrod 24 in the longitudinal direction 54. For instance, the hydraulic actuator can be structured to cause the ramrod 24 to move towards the fully extended position when each piston 58 is being extended or cause the ramrod 24 to move towards the fully retracted position when each piston 58 is being retracted.

FIG. 9 is one example of a hydraulic circuit that may be used for a hydraulic actuator 59. Other hydraulic circuits and hydraulic actuator configurations can be used, which may include open or closed hydraulic circuits, additional control valves, series and/or in parallel arrangements of control valves, etc.

In some embodiments, the hydraulic actuator 59, or a portion thereof, can be affixed to a portion of the breech assembly 10. In other embodiments, the hydraulic actuator 59 can be a separate unit, where each cylinder and piston assembly 56 can be configured to connect to the hydraulic actuator 59 via hydraulic couplings and hydraulic hoses. In an exemplary embodiment, the hydraulic actuator 59 may be attached to a portion of the breech assembly 10 such that the control lever 66 for actuating a control valve is adjacent the breech 22. For example, the control lever 66 can be positioned between the first distal end 14 and the breech 22, as shown in FIG. 8. Positioning the control lever 66 closer to the first distal end 14 can further ensure that an operator would remain clear from the breech 22 during operation of the device. This can provided added safety, in particular if the device is operated without the breech shield 40.

In alternative embodiments, the hydraulic circuit may be interfaced with an electronic control module to enable control of the hydraulic actuator 59 by way of a push-button controller, a joystick controller, a computer via a user interface, etc. The electronic control module can facilitate operation of the hydraulic actuator 59 in addition to, or in the alternative of, the control lever 66. Use of the electronic control module can further enable operation of the device from a remote location. For example, a user can operate the device while standing at a distance of 20 feet from the device. Interfacing the hydraulic circuit with an electronic control module can be achieved by electro-mechanical actuators acting on pumps and valves within the hydraulic actuator 59 as command signals are transmitted via a processor to cause components of the hydraulic actuator 59 to actuate in a concerted manner. Further embodiments can include algorithms stored within a non-transitory memory of the processor to cause certain operations to be carried out automatically. Command signals can be transmitted from an electronic control module via a hardwire connection or via a wireless communication link.

In some embodiments, the rod 26 can include a plurality of apertures arranged in a serial manner along a longitudinal length of the rod 26. At least one choker 63 (e.g., a circular collar or a circular clamp) can be slidingly engaged with the rod 26. A pin can be used to statically position the choker 63 along the rod 26 by insertion of the pin through an aperture of the choker 63 and an aperture of the rod 26. In such an embodiment, the coupler 61 is not statically attached to the rod 26 but is slidingly engaged with it. As the piston(s) 58 are actuated, their movement can cause the coupler 61 to slide along the rod 26 until it abuts the choker 63 that has been locked in position. Further movement of the piston(s) 58 can cause the ramrod 24 to move (due to engagement of the coupler 61 and choker 63) for operation of the device. Some embodiments can include a choker 63 on each side of the coupler 61. In such embodiments, the pig can be moved through the chamber body 20, through the neck 16, and into the pipe via a series of iterative pushes. For example, actuation of the hydraulic actuator 59 can cause the piston(s) 58 to extend to their fullest extent, whereby the choker 63 can be repositioned along the rod 26 to enable another push further urging the pig through the chamber body 20. This can be repeated until the pig is seated into the pipe to a desired seat-length. Thus, use of the choker 63 can facilitate use of the device with various length pistons 58 via a series of iterative pushes and repositioning of the choker 63. It is contemplated for the movement of the ramrod 24, and thus the pig, through the chamber body 20 to be a slow movement (e.g., approximately 1 foot per second) so as to assure against generating quick release of energy and/or dangerous projectiles. However, other push speeds can be used.

Figure 10:
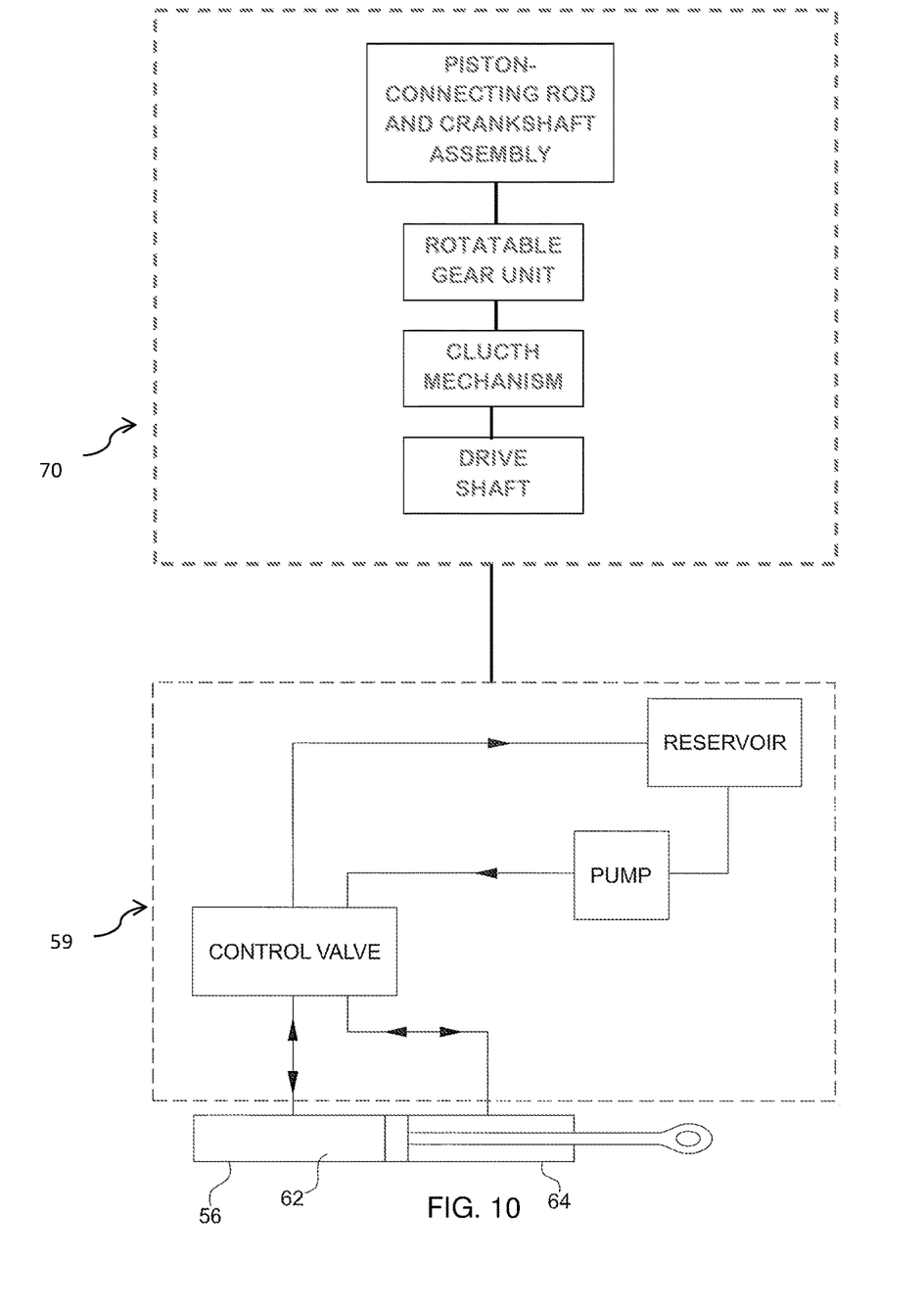
FIG. 10 is an example petroleum powered engine in connection with the hydraulic circuit of FIG. 9.

Referring to FIG. 10, in some embodiments, a petroleum powered (gasoline, diesel, natural gas, propane, etc.) engine 70 can be placed into mechanical connection with the hydraulic actuator 59. Further embodiments can include mounting the petroleum powered engine 70 to a surface of the device (e.g., on a top surface of the ramrod compartment 12). Transfer of power from the petroleum powered engine 70 to the hydraulic actuator 59 can be achieved via a clutch mechanism 76. For example, the petroleum powered engine 70 can include a piston-connecting rod and crankshaft assembly 72, a rotatable gear unit 74, a clutch mechanism 76, and at least one drive shaft 78 operably engaged with the hydraulic actuator 59 via a rotatable hub mount and clutch mechanism 76. Engaging the drive shaft 78 via the clutch mechanism 72 can cause the hydraulic actuator 59 to move the piston(s) 58 and traverse the ramrod 24, as described above. In addition, a throttle control module can be used to vary the power transferred from the petroleum powered engine 70. Other configurations of the petroleum powered engine 70 can be used.

In some embodiments, hydraulic connectors, hydraulic power take-off ("PTO") connectors, or other hydraulic power/control interfaces can be disposed on the device and placed into connection with the hydraulic circuit. This may facilitate transfer of power to the hydraulic actuator and/or enable control of the hydraulic circuit from ancillary devices (forklift, tractor, etc.). If the petroleum powered engine becomes inoperable and/or if any component of the hydraulic actuator 59 becomes inoperable, such hydraulic interfaces can facilitate operation of the device via other means. In addition, the device can be operated in a non-mechanized/non-automated manner, regardless of the petroleum powered engine and/or the hydraulic actuator 59 being inoperable. In other words, the ramrod 24 can always be actuated by pulling and pushing it with mobile equipment, as described above.

Further embodiments can include mechanical stop associated with lock-out points to improve safety. For example, a mechanical stop, such as a locking slide bar, may be included within the chamber body 20 and/or ramrod compartment 12 to lock the ramrod 24 in a desired position. A locking slide bar may be configured to traverse a cross-sectional path of the ramrod 24 when the locking slide bar is in a deployed state. Thus, when the slide bar is deployed, the ramrod 24 is unable to move along the longitudinal direction 54, regardless of the force applied to it. For instance, at least one slide bar aperture can be formed within a portion of the breech assembly 10, and at least one corresponding slide bar aperture can be formed within the rod 26. Locking-out the device can then be achieved by moving the ramrod 24 so that the slide bar apertures align so as to facilitate insertion of the locking slide bar. In the event an operator would have to gain access to in interior of the device, the device can be first locked-out to provide added safety and reduce the risk of being injured from any release of energy from an energized portion of the device.

As noted above, the pig loader device can be used for introducing a pig into the pipe to perform structural integrity testing. For example, after a pig is seated into the pipe, the pig loader device can be removed from the device so that a header or pressure end test cap can be affixed to the mouth of the pipe. The header can facilitate introducing of fluid (e.g., air, water, nitrogen, argon, etc.) behind the pig to occupy a volume of pipeline existing between the pig and the header (i.e., a volume of pipeline designated as a test section) and to generate a desired pressure within the test section. Changes in pressure and other parameters can be monitored to ascertain the structural integrity of the test section.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

We claim:

1. A pig loader device, comprising:
   a body having a first distal end and a second distal end defining a longitudinal axis, wherein a bore extends from the first distal end to the second distal end;
   an aperture formed in a surface of the body generating a breech;
   a ramrod compartment configured to facilitate slideable motion of a ramrod along the longitudinal axis;
   a chamber body adjacent the ramrod compartment, the chamber body configured to receive a pig;
   a neck adjacent the chamber body, the neck configured to facilitate connection of the pig loader device to an ancillary pipe;
   a breech shield configured to selectively cover the breech;
   wherein when the pig is within the chamber body and the ramrod is motioned in the longitudinal direction to advance from the first distal end to the second distal end, the ramrod forces the pig through the neck and into the ancillary pipe.

2. The device recited in claim 1, further comprising a breech flange disposed on the neck.

3. The device recited in claim 2, wherein the breech flange is provided with at least one flange aperture.

4. The device recited in claim 1, further comprising a breech plate disposed on a distal end of the ramrod.

5. The device recited in claim 4, further comprising a push plate disposed on a distal end of the ramrod that is opposite the breech plate.

6. The device recited in claim 1, further comprising a hydraulic actuator configured to actuate the ramrod to cause the ramrod to motion in the longitudinal direction.

7. The device recited in claim 6, further comprising a petroleum powered engine in mechanical connection with the hydraulic actuator.

8. The device recited in claim 1, further comprising at least one of a shackle and a lift arm disposed on a surface of the device.

9. A pig loader device, comprising:
   a breech assembly comprising a chamber body with a ramrod compartment, a breech, and a neck;
   a ramrod having a rod and a breech plate, wherein the ramrod is disposed within the ramrod compartment and configured to slideably traverse the ramrod compartment and chamber body; and,
   a breech shield configured to selectively cover the breech in a covered position, the covered position being placement of the breech shield over the breech to prevent ingress and egress of objects through the breech;
   a securement means to temporarily secure the breech shield in a the covered position;
   wherein the neck is configured to facilitate connection of the pig loader device to an ancillary pipe and guide a pig into the ancillary pipe; and,
   wherein the ramrod compartment is configured to align the ramrod so that when the breech plate is advanced in a direction from the ramrod compartment toward the neck, the breech plate forces the pig placed within the chamber body through the neck and into the ancillary pipe.

10. The device recited in claim 9, further comprising a breech flange disposed on the neck.

11. The device recited in claim 10, wherein the breech flange is provided with at least one flange aperture.

12. The device recited in claim 9, further comprising a push plate disposed on a distal end of the ramrod that is opposite the breech plate.

13. The device recited in claim 9, wherein the securement means comprises a plurality of keyed plates disposed on the breech shield and the breech assembly, each keyed plate being configured to receive locking bolts.

14. The device recited in claim 9, further comprising a hydraulic actuator configured to actuate the ramrod to cause the ramrod to traverse the ramrod compartment and chamber body.

15. The device recited in claim 14, further comprising a petroleum powered engine in mechanical connection with the hydraulic actuator.

16. The device recited in claim 9, further comprising at least one of a shackle and a lift arm disposed on a surface of the device.

17. A pig loader device, comprising:
   an elongated body having a first distal end and a second distal end defining a longitudinal axis, wherein a bore extends from the first distal end to the second distal end;
   an aperture formed in a surface of the elongated body, generating a breech;
   a ramrod compartment configured to facilitate slideable motion of a ramrod along the longitudinal axis;
   a chamber body adjacent the ramrod compartment, the chamber body configured to receive a pig;
   a neck adjacent the chamber body, the neck configured to facilitate connection of the pig loader device to an ancillary pipe, wherein when the pig is within the chamber body and the ramrod is motioned in the longitudinal direction to advance from the first distal end to the second distal end, the ramrod forces the pig through the neck and into the ancillary pipe; and,
   a hydraulic actuator configured to generate a unidirectional force along the longitudinal direction, the hydraulic actuator comprising:
   at least one cylinder and piston assembly, each configured to generate a force vector that is in the longitudinal direction, wherein each cylinder is attached to a portion of the elongated body and each piston is attached to a portion of the ramrod; and,
   at least one control valve, a reservoir, and a pump in mechanical connection with a control lever;
   wherein actuation of the control lever caused hydraulic fluid to flow to or from the reservoir and cause the at least one cylinder and piston assembly to generate the force vector in the longitudinal direction and;
   wherein the force vector causes the ramrod to motion in the longitudinal direction.

18. The device recited in claim 17, further comprising a breech shield configured to selectively cover the breech and a securement means to temporarily secure the breech shield to the pig loader device.

19. The device recited in claim 17, further comprising a petroleum powered engine in mechanical connection with the hydraulic actuator.

\* \* \* \* \*